(12) United States Patent
Gupta et al.

(10) Patent No.: US 6,552,339 B1
(45) Date of Patent: Apr. 22, 2003

(54) MICRO GONIOMETER FOR SCANNING PROBE MICROSCOPY

(75) Inventors: Arunava Gupta, Valley Cottage, NY (US); Ravi Saraf, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/572,209

(22) Filed: May 17, 2000

Related U.S. Application Data

(62) Division of application No. 08/960,692, filed on Oct. 29, 1997, now Pat. No. 6,100,523.

(51) Int. Cl.[7] .......................... G01N 23/00; G21K 7/00; G21K 5/00; G01B 5/28
(52) U.S. Cl. ...................... 250/310; 250/306; 250/307; 250/442.1; 73/105
(58) Field of Search ................................ 250/310, 306, 250/307, 442.1; 428/321.1; 73/105

(56) References Cited

U.S. PATENT DOCUMENTS

| | | | | |
|---|---|---|---|---|
| 4,343,993 A | * | 8/1982 | Binnig et al. ............... 250/306 |
| 4,906,840 A | * | 3/1990 | Zdeblick et al. ............ 250/306 |
| 5,103,095 A | | 4/1992 | Elings et al. |
| 5,186,041 A | * | 2/1993 | Nyyssonen .................. 73/105 |
| 5,267,471 A | * | 12/1993 | Abraham et al. ............. 73/105 |
| 5,298,975 A | * | 3/1994 | Khoury et al. ............... 356/375 |
| 5,317,533 A | * | 5/1994 | Quate et al. ................. 365/151 |
| 5,367,165 A | * | 11/1994 | Toda et al. .................. 250/306 |
| 5,400,647 A | * | 3/1995 | Elings .......................... 73/34 |
| 5,461,907 A | * | 10/1995 | Tench et al. .................. 73/105 |
| 5,591,903 A | * | 1/1997 | Vesenka et al. ............... 73/105 |
| 5,741,614 A | * | 4/1998 | McCoy et al. ................ 430/30 |
| 5,760,300 A | * | 6/1998 | Kajimura ....................... 73/73 |
| 5,883,705 A | * | 3/1999 | Minne et al. .................. 355/71 |
| 5,902,928 A | * | 5/1999 | Chen et al. .................... 73/105 |
| 5,969,273 A | * | 10/1999 | Archie et al. ............... 73/865.8 |
| 6,013,336 A | * | 1/2000 | Baumgart et al. ........... 427/555 |
| 6,017,618 A | * | 1/2000 | Gupta et al. .............. 428/321.1 |
| 6,027,951 A | * | 2/2000 | MacDonald et al. ........... 438/20 |
| 6,100,523 A | * | 8/2000 | Gupta et al. ................ 250/306 |
| 6,118,124 A | * | 9/2000 | Thundat et al. .............. 250/332 |
| 6,185,991 B1 | * | 2/2001 | Hong et al. .................... 73/105 |
| 6,257,053 B1 | * | 7/2001 | Tomita et al. ................. 73/105 |
| 6,323,483 B1 | * | 11/2001 | Cleveland et al. ........... 250/306 |
| 6,405,584 B1 | * | 6/2002 | Bindell et al. ................ 73/105 |

* cited by examiner

*Primary Examiner*—Bruce Anderson
*Assistant Examiner*—Bernard E. Souw
(74) *Attorney, Agent, or Firm*—Scully, Scott, Murphy & Presser; Robert M. Trepp, Esq.

(57) ABSTRACT

A goniometer for performing scanning probe microscopy on a substrate surface is disclosed. The goniometer has a cantilever, having a cantilevered end and a supported end and a tip disposed at the cantilevered end of the cantilever. The goniometer also has a block disposed at the supported end of the cantilever. The block has at least one pair of piezoelectric layers, a pair of electrodes disposed about each individual piezoelectric layer such that varying a potential difference applied between the individual electrodes of a pair of electrodes causes the corresponding piezoelectric layer to deform, and a first insulating material disposed between the individual electrodes for insulating the individual electrodes from each other. The individual piezoelectric layers are deformed at different rates resulting in a deformity of the block and tilting of the cantilever and tip connected therewith. Also disclosed are methods of using the goniometer of the present invention to measure the interactive forces between two molecular structures using a scanning probe microscope equipped with a goniometer of the present invention.

6 Claims, 13 Drawing Sheets

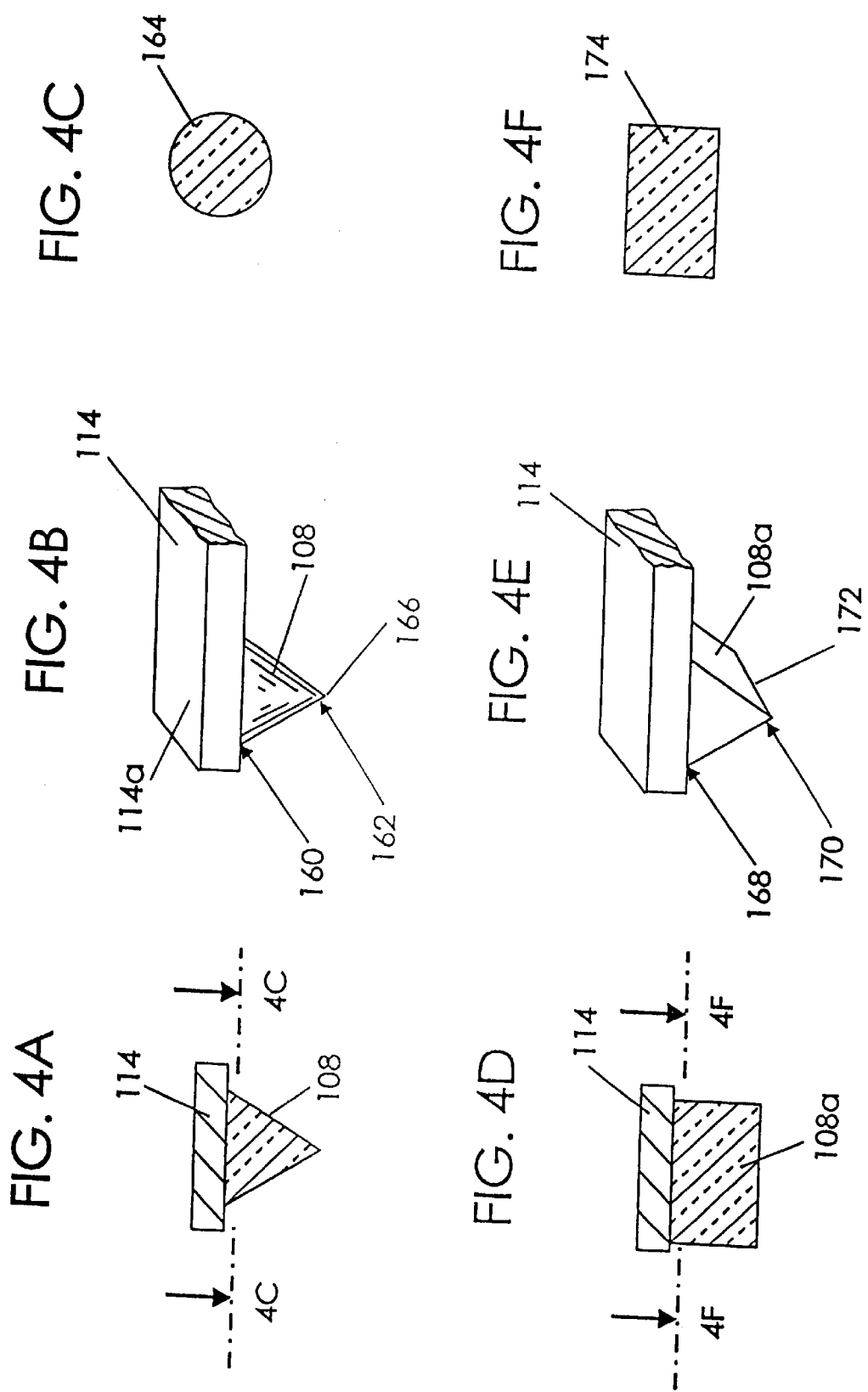

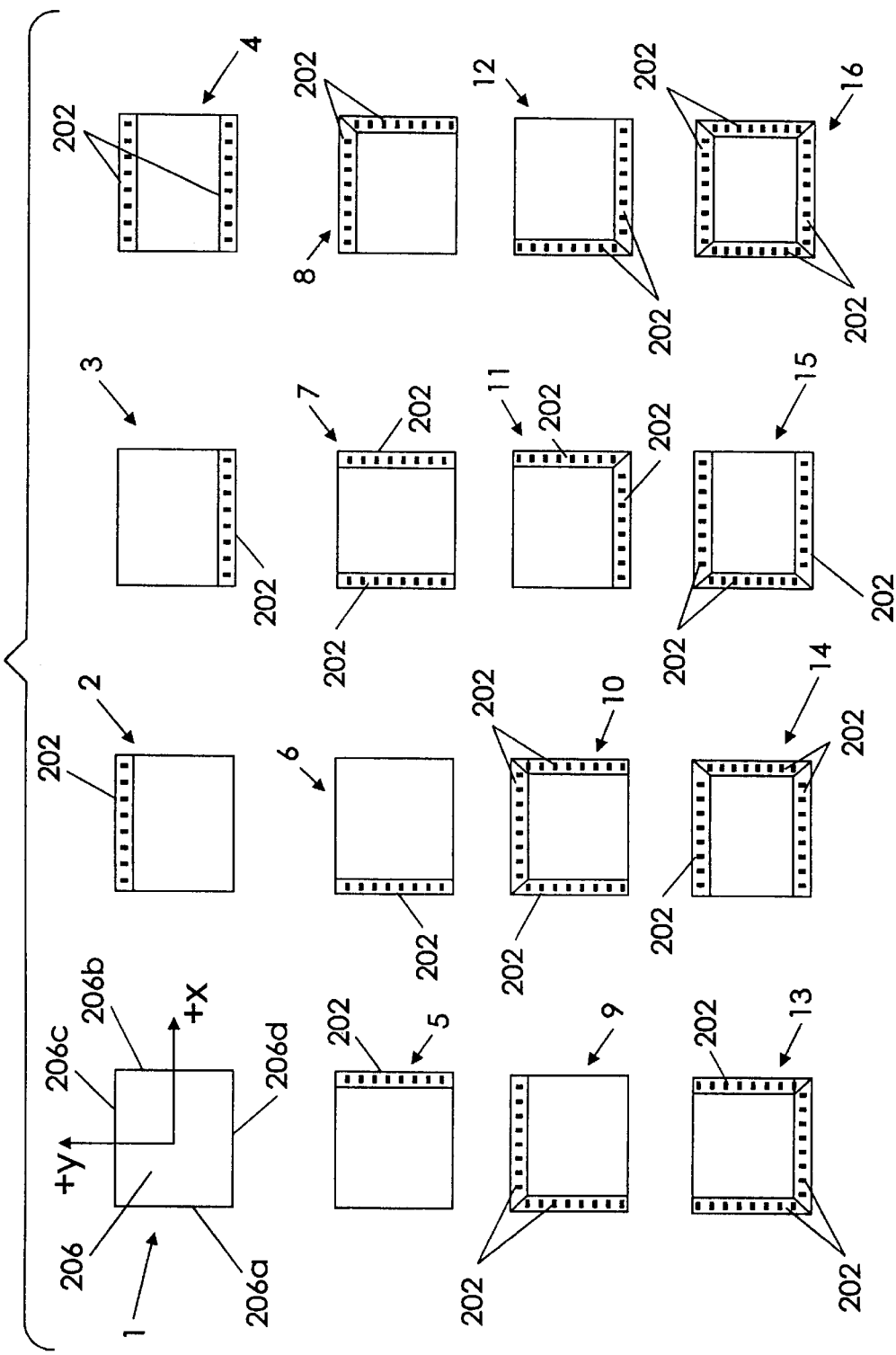

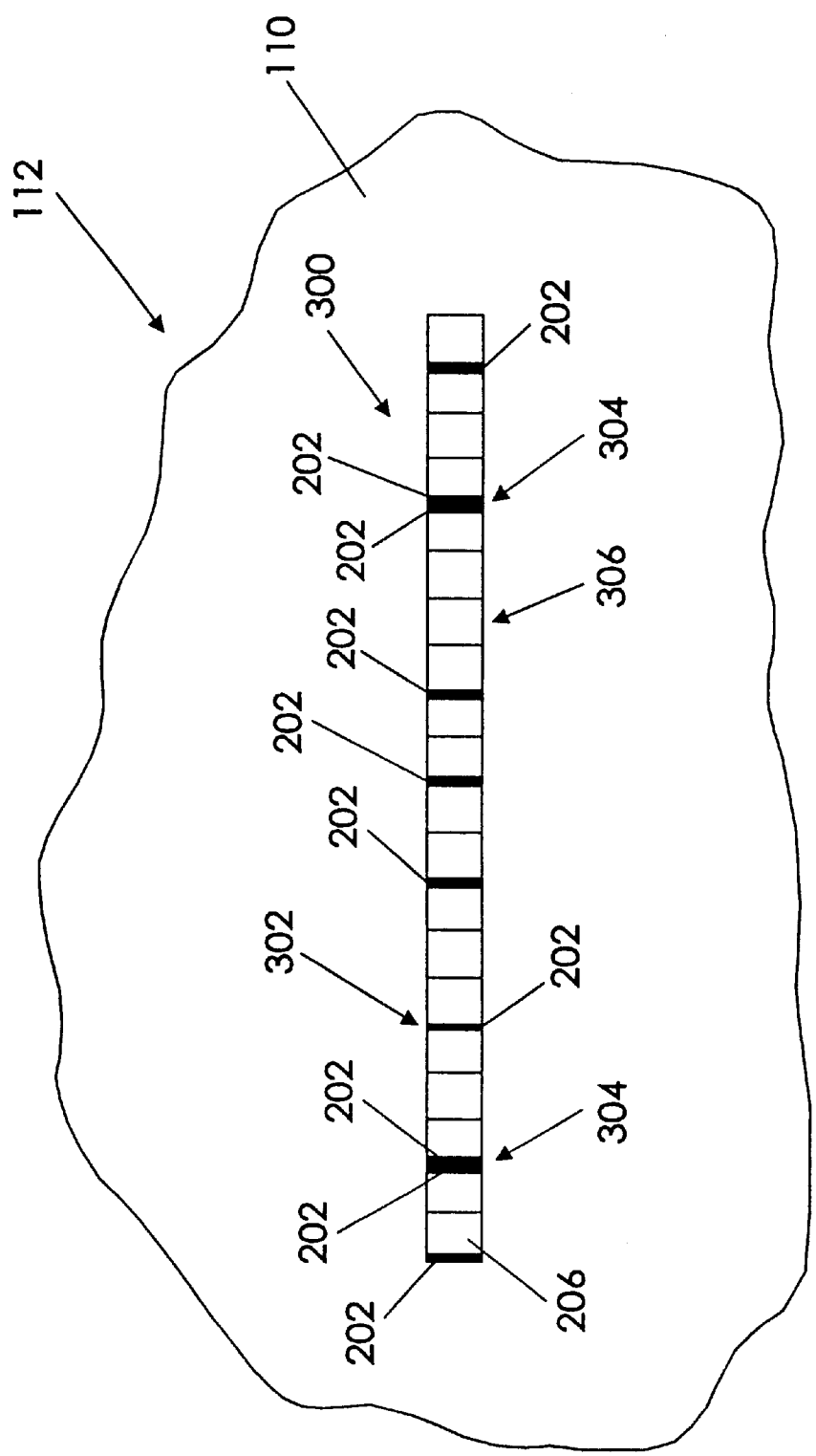

MICRO GONIOMETER FOR SCANNING PROBE MICROSCOPY

RELATED APPLICATIONS

U.S. patent application Ser. No.08/960,693, now U.S. Pat. No. 6,017,618 entitled "ULTRA HIGH DENSITY STORAGE MEDIA AND METHOD THEREOF," filed on even date herewith for Ravi Saraf and Arunava Gupta is incorporated herein by reference.

This application is a divisional application of Ser. No. 08/960,692; filed on Oct. 29, 1997, now U.S. Pat. No. 6,100,523.

BACKGROUND OF THE INVENTION

1. Field of the Invention

The field of art to which this invention relates is goniometers. Specifically, this invention relates to micro goniometers for scanning microscopy.

2. Description of the Related Art

With the advent of scanning probe microscopes such as scanning tunneling microscopes (STM) and atomic force microscopes (AFM) several methods have been developed to use their small scale processing capability for high density data storage. In these methods, a probe, or tip interacts with atoms or molecules on a substrate surface to form bumps. The bump forms a bit of information which is represented in a base two (binary) format (i.e., as a 1 or a 0). Movement of the tip is typically controlled by a goniometer. However, goniometers of the prior art limit the movement of the tip to the z-direction, that is, normal to the substrate surface. An example of such a use is disclosed in U.S. Pat. No. 5,327,625 to Clark et al. Although these methods have their advantages, such as high storage density, they are plagued by several disadvantages.

The main disadvantage of scanning probe microscope data storage is that the speed of writing and replication is prohibitively slow. Conventional magnetic and CD-ROM recording rates are approximately $10^8$ and $1.510^6$ bits/second respectively, while STM atom writing is less than 1 bit/second.

Additionally, writing at the atomic level is usually performed at very cold temperatures and in a vacuum. The equipment used to perform atomic scale writing is therefore very sophisticated and expensive. There are also disadvantages in reading the information written at the atomic level. Atomic scale resolution of the media surface is necessary to read the data. This also requires sophisticated and expensive equipment.

While scanning probe microscopes have advanced the art of microscopy on the atomic scale, their potential has not been fully realized due to the inflexibility of the tip used to interact with the substrate surface.

In addition to high density data storage, scanning probe microscopes, particularly the AFM, have been used in recent years to probe molecular interactions. In this method, the AFM tip of a specific molecular structure is brought close to the substrate surface which is also of a specific molecular structure. The tip is supported on the free end of a cantilever, the deflection of the tip cantilever as a function of tip displacement reveals the force of interaction between the two surfaces (the tip and the substrate) as a function of distance. This force relates to the nature of the interaction. Although the force measurement and the displacement are accurate, the surface area of the interacting surface is not well controlled because the tip angle is fixed and unknown relative to the substrate surface.

SUMMARY OF THE INVENTION

Therefore, it is an object of the present invention to provide a goniometer for use with a scanning probe microscope and having a tip capable of tilting in at least one direction.

It is yet another object of the present invention to provide a goniometer for use with a scanning probe microscope and having a tip capable of tilting in at least one direction which can be utilized for high speed, high density writing to a substrate surface.

It is yet another object of the present invention to provide oscillating motion of the tip in the direction normal to the substrate surface and pendular motion about at least one axis parallel to the plane of the substrate surface.

It is yet another object of the present invention to provide a method for testing the interactive forces between two molecular structures with a scanning probe microscope at differing degrees of tip interaction. It is yet another object of the present invention to measure the dynamic interaction between the tip surface and the substrate surface by oscillating the tip.

Accordingly, a goniometer for performing scanning probe microscopy on a substrate surface is provided. The goniometer comprises a cantilever, having a cantilevered end and a supported end, a tip disposed at the cantilevered end of the cantilever, and a block disposed at the supported end of the cantilever. The block has at least one pair of piezoelectric layers and a pair of electrodes disposed about each individual piezoelectric layer. A potential difference is applied between the individual electrodes of a pair of electrodes which causes the corresponding piezoelectric layer to deform. Also provided, is an insulating material disposed between the individual electrodes for insulating the individual electrodes from each other. The individual piezoelectric layers are deformed at different rates resulting in a deformity of the block and tilting of the cantilever and tip connected therewith.

Another aspect of the present invention are methods for testing the interactive forces between two molecular structures with a scanning probe microscopes at differing degrees of tip interaction. The method comprises the steps of providing an AFM tip of a first molecular structure and providing a substrate material of a second molecular structure. The next step comprises bringing the tip in proximity to the substrate surface at an angle relative to the substrate surface, such that a force of interaction exists between the tip and substrate material. The interactive force is then measured and the tip angle is varied. The interactive force is then measured at the varied tip angle. Preferably, the varying and measuring steps are repeated for a plurality of angles until sufficient data is gathered regarding the tip and substrate surface interactions.

A variation of this method is also disclosed where the tip is oscillated normal to the surface of the substrate material to measure the dynamic interaction between the tip molecular structure and the substrate surface molecular structure.

BRIEF DESCRIPTION OF THE DRAWINGS

These and other features, aspects, and advantages of the apparatus and methods of the present invention will become better understood with regard to the following description, appended claims, and accompanying drawings where:

FIG. 4A illustrates a sectional view of the goniometer tip of FIG. 2 as taken along line 4A—4A;

FIG. 4B illustrates a partial enlarged isometric view of the goniometer tip of FIG. 2A as viewed along line 4B—4B;

FIG. 4C illustrates a sectional view of the tip of FIG. 4A as taken along line 4C—4C;

FIGS. 4D and 4E illustrate views of an alternate tip as would be illustrated in FIG.s 4A and 4B, respectively;

FIG. 4F illustrates a sectional view of the tip of FIG. 4D as taken along line 4F—4F;

FIG. 7 illustrates a molecular bar-code disposed on the surface of a silicon wafer chip;

FIG. 8 illustrates a molecular bar-code written with the goniometer of the present invention;

DETAILED DESCRIPTION OF THE PREFERRED EMBODIMENTS

Scanning probe microscope tips of the prior art allow only motion along the z-axis which is useful for moving molecules or atoms but not very efficient for other applications. A tip which scans in the x- and y-directions ($\omega_x$ and $\omega_y$, respectively) as well as tilts toward the x- and y-axes would greatly facilitate the use of scanning probe microscopes in other applications, as well as provide new applications not now possible.

Figure 1A:
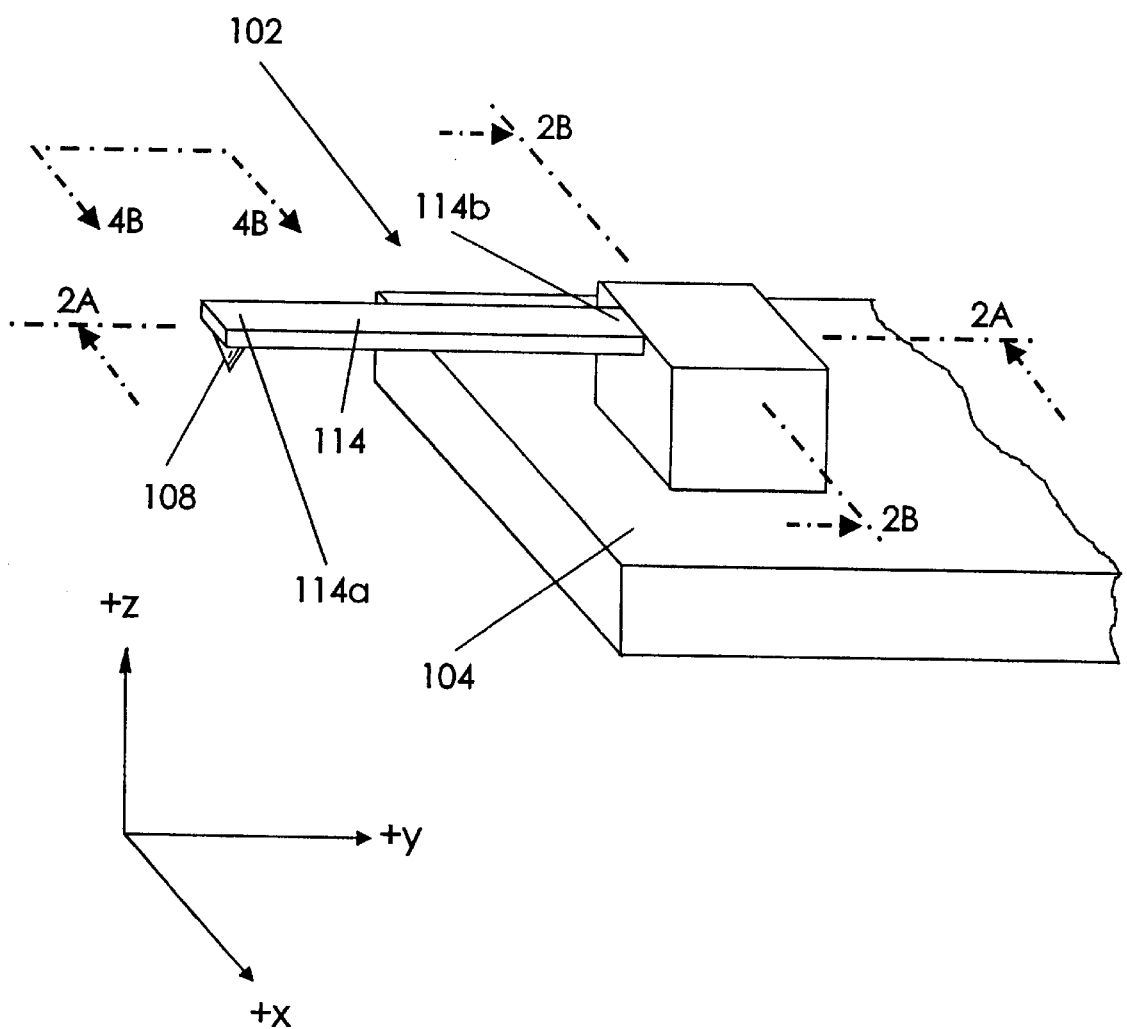
FIG. 1A illustrates an isometric view of a goniometer of the present invention.
Figure 2A:
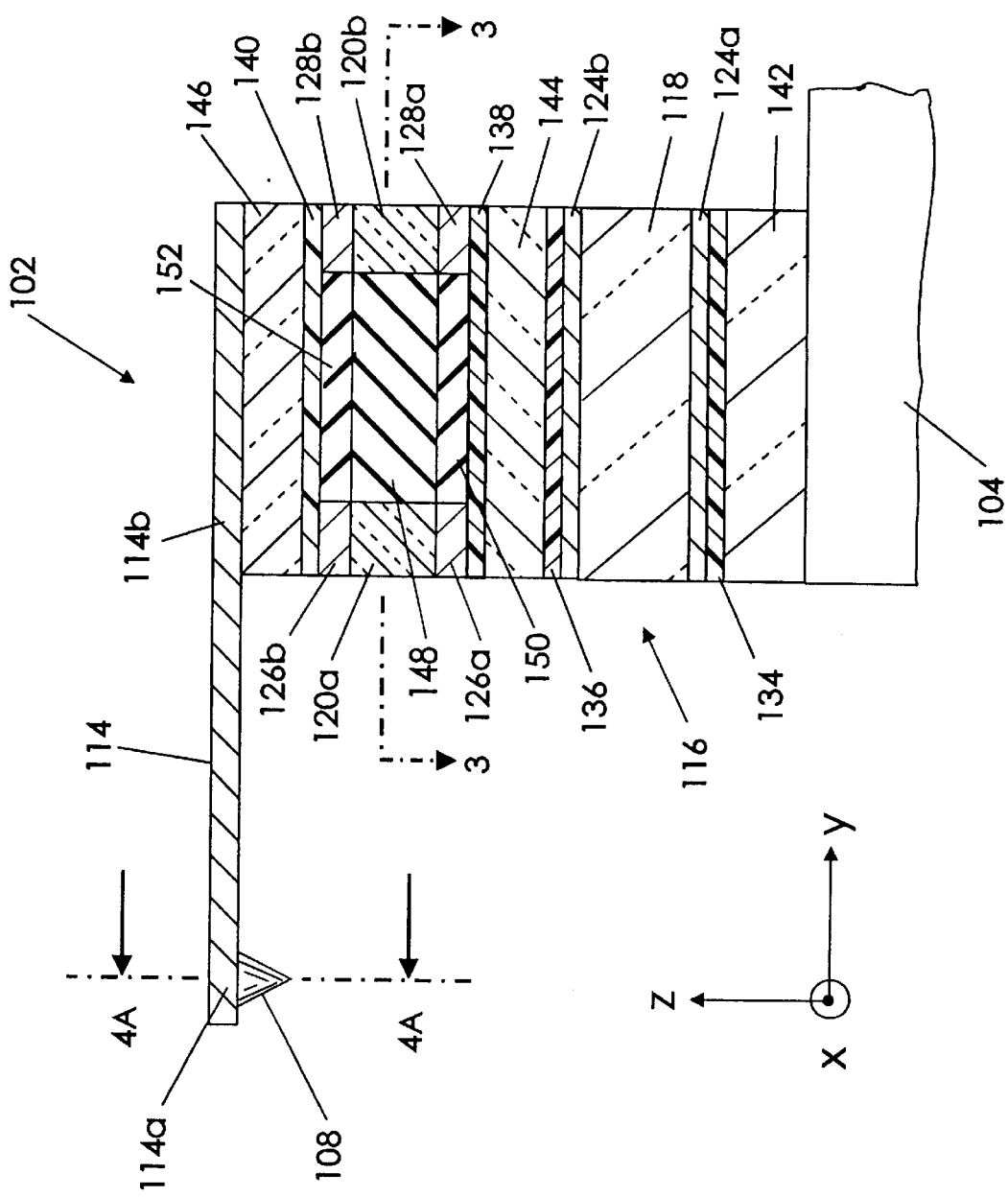
FIG. 2A illustrates a sectional view of the goniometer of FIG. 1A as taken along line 2A—2A.
Figure 2B:
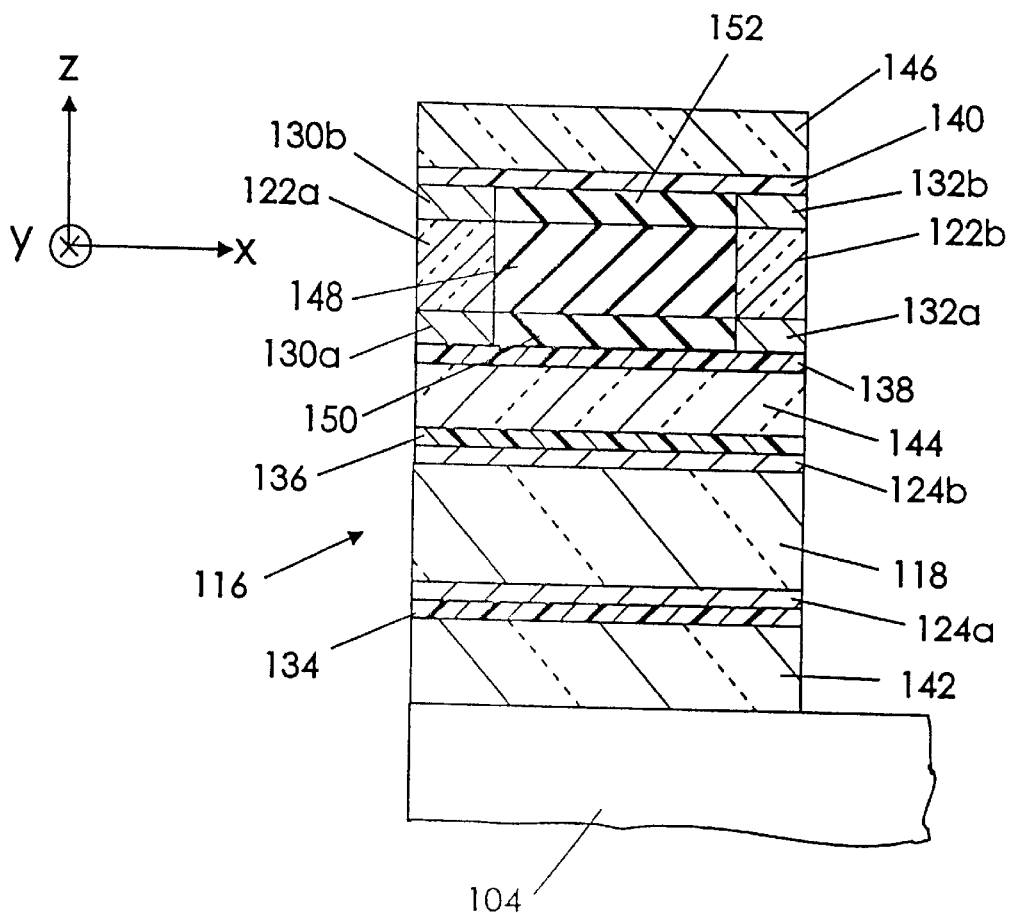
FIG. 2B illustrates a sectional view of the goniometer of FIG. 1A as taken along line 2B—2B.

Referring now to FIGS. 1A, 2A, and 2B, there is illustrated a single goniometer 102 on a substrate plate 104. The plate 104 is preferably fabricated from a silicon substrate and fixed while the substrate sits upon a three axis piezoelectric stage 106. However, the plate 104 can alternatively sit upon the three axis piezoelectric stage 106, with the substrate being fixed. The goniometer 102 has a cantilever 114 having a cantilevered end 114a and a supported end 114b. The goniometer 102 also has a tip 108 for writing onto a surface 110 of a substrate material 112 using a scanning probe microscope (not shone). The goniometer 102 is configured to accomplish the following three tip motions; translation in the z-direction, tilt about the y-axis, and tilt about the x-axis. The tip 108 is mounted on the cantilevered end 114a of the cantilever. The supported end 114b of the cantilever 114 is mounted on a block 116, preferably of multi-layer construction. Layers 118, 120a, 120b, 122a, and 122b are first second, third, fourth, and fifth piezoelectric layers, respectively. The piezoelectric layers provide z-axis translation, y-axis tilt, and x-axis tilt, of the cantilever 114, and thus the tip 108, with the second and third piezoelectric layers 120a, 120b operating as a pair and the fourth and fifth piezoelectric layers 122a, 122b operating as a pair. A pair of electrodes surround each piezoelectric layer for actuation of the piezoelectric layers. A first pair of electrodes, 124a, 124b surround and actuate the first piezoelectric layer 118, a second pair of electrodes, 126a, 126b surround and actuate the second piezoelectric layer 120a, a third pair of electrodes, 128a, 128b surround and actuate the third piezoelectric layer 120b, a fourth pair of electrodes, 130a, 130b surround and actuate the fourth piezoelectric layer 122a, and a fifth pair of electrodes, 132a, 132b surround and actuate the fifth piezoelectric layer 122b. Photo-imagable dielectric layers 134, 136, 138, and 140 insulate the electrodes as well as provide adhesion. The photo-imagable dielectric layers 134, 136, 138, and 140 may be single or multiple layers and are preferably fabricated from a photo-imagable epoxy. Inorganic dielectric layers 142, 144 may also be used to provide a planarized (i.e., smooth) surface to coat the next organic layer. Layer 146, preferably a suitable organic material may also be used. The dielectric layers 142, 144, and 146 are preferably fabricated from a relatively hard material such as silicon dioxide or silicon nitride. A first filler layer 148 is provided to insulate the second, third, fourth, and fifth piezoelectric layers 120a, 120b, 122a, and 122b, respectively, from each other. The first filler layer 148 is preferably an organic dielectric layer composed of materials such as polyimide or polysulfone. A second filler layer 150 insulates electrodes 126b, 128b, 130b, and 132b from each other. A third filler layer 152 insulates electrodes 126a, 128a, 130a, and 132a from each other. The second and third filler layers 150, 152 are preferably composed of the same materials as the first filler layer 148.

Figure 3:
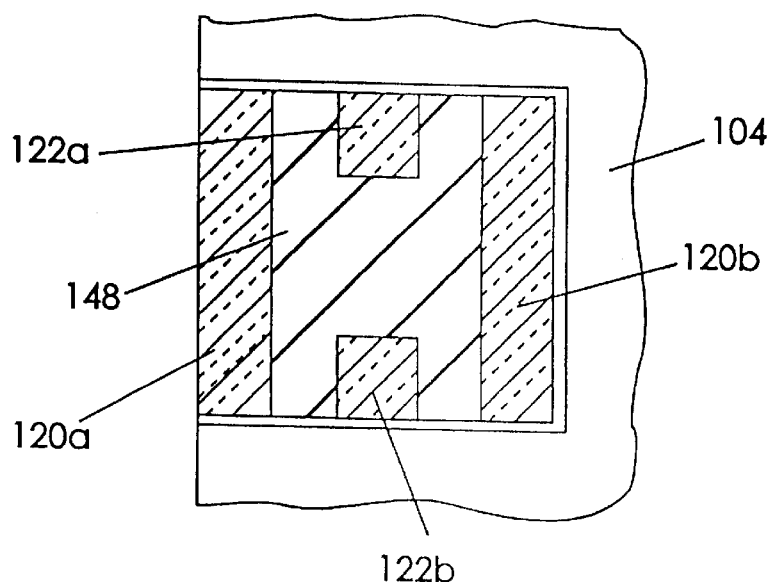
FIG. 3 illustrates a sectional view of the goniometer of FIG. 2 as taken along line 3—3.
Figure 5A:
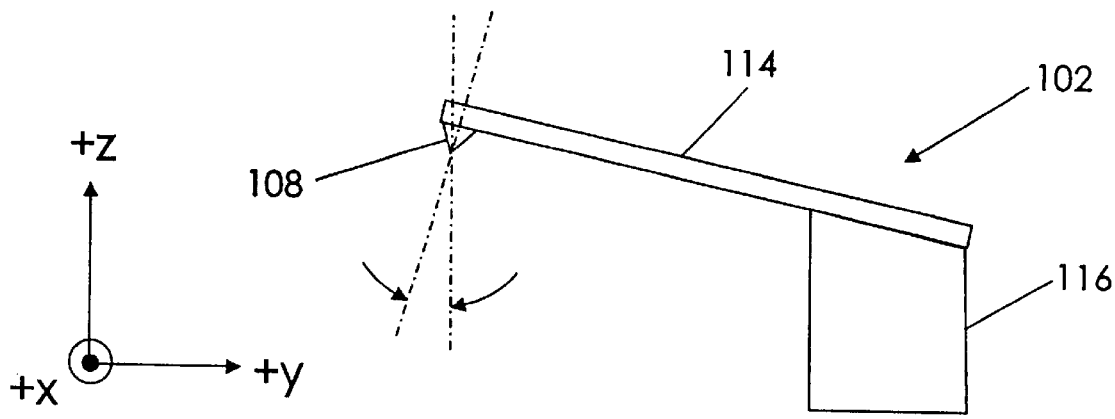
FIG. 5A illustrates a goniometer of the present invention tilted toward the negative y-axis.
Figure 5B:
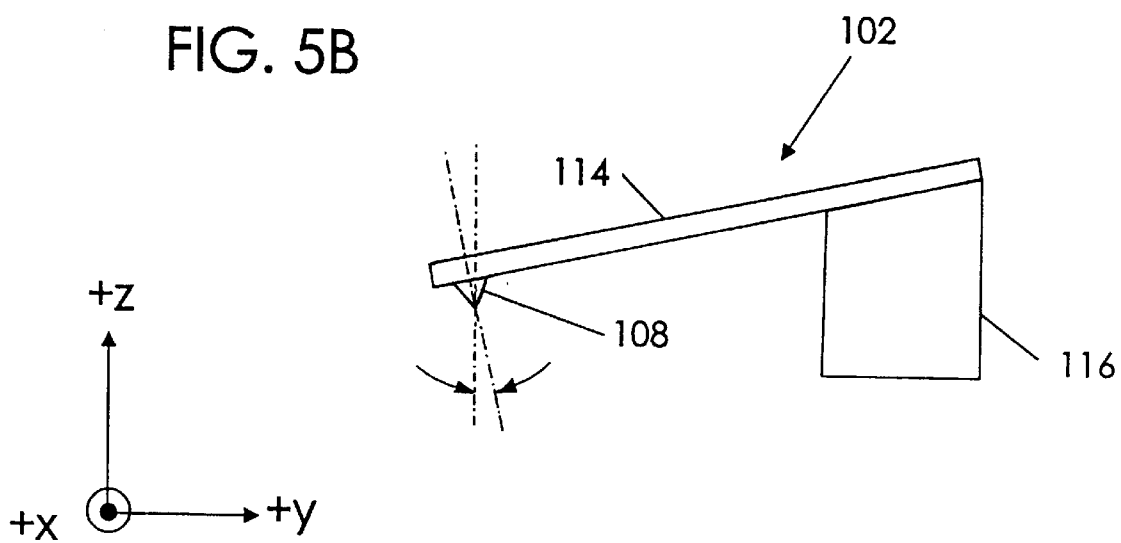
FIG. 5B illustrates a goniometer of the present invention titled toward the positive y-axis.
Figure 5C:
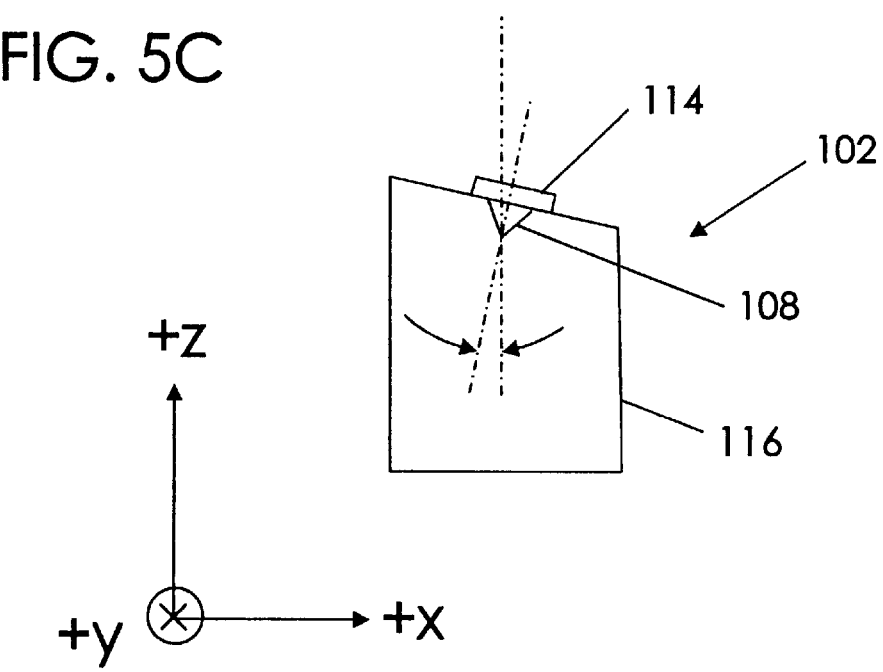
FIG. 5C illustrates a goniometer of the present invention titled toward.the negative x-axis.
Figure 5D:
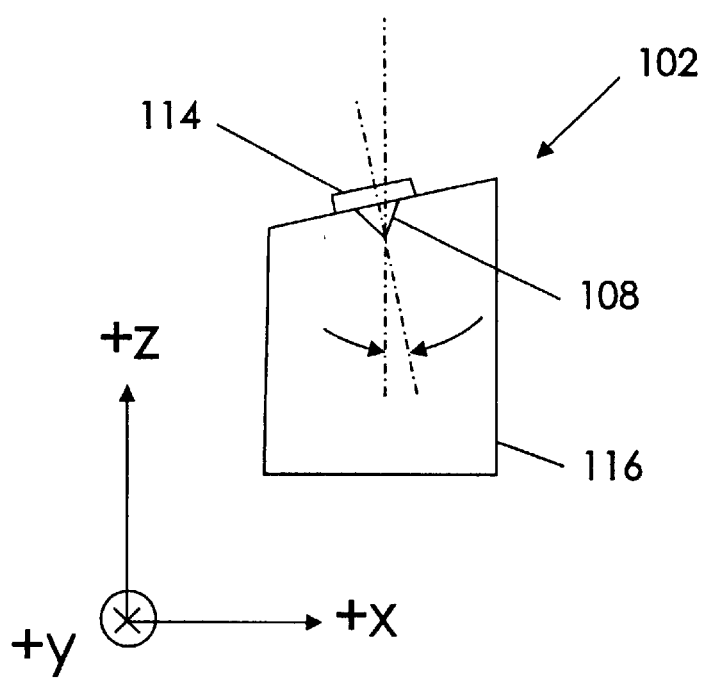
FIG. 5D illustrates a goniometer of the present invention titled toward the positive x-axis.

Referring now to FIGS. 2A, 2B, and 3 the operation of the goniometer 102 will now be described. In order to achieve the desired tilt of the tip 108, different combinations of the second, third, fourth, and fifth piezoelectric layers 120a, 120b, 122a, and 122b are activated to tilt the tip 108 toward either the positive x, negative x, positive y, or negative y axes. To tilt the tip toward the positive x-axis, the fifth piezoelectric layer 122b is expanded by applying a potential difference between the fifth pair of electrodes 132a, 132b. This will cause the cantilever 114 and hence the tip 108 connected therewith to tilt toward the positive x-axis as shown in FIG. 5D. Alternatively, a greater potential can be applied between the fifth pair of electrodes 132a, 132b than is applied between the fourth pair of electrodes 130a, 130b causing the fifth piezoelectric layer 122b to expand larger than the fourth piezoelectric layer 122a, also resulting in the tip 108 tilting toward the positive x-axis To tilt the tip 108 toward the negative x-axis, the fourth piezoelectric layer 122a is expanded by applying a potential difference between the fourth pair of electrodes 130a, 130b. This will cause the cantilever 114 and hence the tip 108 connected therewith to tilt toward the negative x-axis as shown in FIG. 5C. Alternatively, a greater potential can be applied between the fourth pair of electrodes 130a, 130b than is applied between the fifth pair of electrodes 132a, 132b causing the fourth piezoelectric layer 122a to expand larger than the fifth piezoelectric layer 122b, also resulting in the tip 108 tilting toward the negative x-axis.

To tilt the tip 108 toward the positive y-axis, the third piezoelectric layer 120b is expanded by applying a potential difference between the third pair to electrodes 128a, 128b. This will cause the cantilever 114 and hence the tip 108 connected therewith to tilt toward the positive y-axis as shown in FIG. 5B.

Alternatively, a greater potential can be applied between the third pair of electrodes 128a, 128b than is applied between the second pair of electrodes 126a, 126b causing the third piezoelectric layer 120b to expand larger than the second piezoelectric layer 20a, also resulting in the tip 108 tilting toward the positive y-axis. To tilt the tip 108 toward the negative y-axis, the second piezoelectric layer 120a is expanded by applying a potential difference between the second pair of electrodes 126a, 126b. This will cause the cantilever 114 and hence the tip 108 connected therewith to tilt toward the negative y-axis as shown in FIG. 5A. Alternatively, a greater potential can be applied between the second pair of electrodes 126a, 126b than is applied between the third pair of electrodes 128a, 128b causing the second piezoelectric layer 120a to expand larger than the third piezoelectric layer 120b, also resulting in the tip 108 tilting toward the negative y-axis.

Another alternative for tilting the tip 108 toward the positive x, negative x, positive y, and negative y axes is to normally apply a potential difference between pairs of electrodes to cause the corresponding piezoelectric layer to normally be in an expanded state, and to contract the piezoelectric layer into its relaxed state by removing or decreasing the potential between electrodes. For instance, the fourth and fifth piezoelectric layers 122a, 122b respectively, can be normally expanded by applying a potential difference between their respective pairs of electrodes, namely, the fourth pair of electrodes 130a, 130b and, the fifth pair of electrode 132a, 132b. To tilt the tip 108 toward the positive x-axis, the fourth piezoelectric layer 122a is contracted by removing or decreasing the potential difference between the fourth pair of electrodes 130a, 130b resulting in a tilt toward the positive x-axis. Alternatively, a greater potential difference can be maintained between the fourth pair of electrodes 130a, 130b then is maintained between the fifth pair of electrodes 132a, 132b, resulting in the fourth piezoelectric layer 122a contracting more than the fifth piezoelectric layer 122b, also resulting in the tip 108 tilting toward the positive x-axis.

The degree at which the tip 108 is tilted is also useful. This is determined by the difference in the amount of expansion between pairs of piezoelectric layers. For instance, if the second piezoelectric layer 120a expands to a height which is twice that of the third piezoelectric layer 120b, than by simple geometry, knowing these heights and the distance between the two piezoelectric layers, the angle at which the tip 108 is tilted in the negative y direction can be calculated.

The goniometer 102 in its preferred configuration, also provides movement along the z-axis. This movement is more of a fine movement along the z-axis, with the stage 104 providing a coarse movement along the z-axis. Applying a potential difference between the first pair of electrodes 124a, 124b expands the first piezoelectric layer 118 from a relaxed position. The expansion provides movement along the z-axis. Alternatively, the first piezoelectric layer 118 can be normally expanded and contracted toward its relaxed position when the potential difference between the first pair of electrodes 124a, 124b is removed or decreased.

The tip 108 is preferably fabricated from a hard material such as silicon nitride, tungsten carbide, or silicon dioxide, as is the cantilever 114. Tips 108 of the prior art are pointed as is shown in FIG. 4A, which is necessary to move atoms. The pointed tips 108 are either conical, as shown in FIGS. 4A, 4B, and 4C, or pyramid shaped (not shown). The conical tips 108 have a first end 160 with a circular cross-section 164 which is proximate to, and affixed to, the cantilevered end 114a of the cantilever 114. The circular cross-section 164 tapers down to a point 166 at a second end 162 of the tip 108. The point 166 being proximate to the substrate surface 110. Similarly, pyramid shaped tips have an end with a rectangular cross-section which is proximate to, and affixed to, the cantilevered end 114a of the cantilever 114. The rectangular cross-section tapers down to a point at the other end of the tip. The point being proximate to the substrate surface 110. However, rips 108 of different geometry can be used for different applications. One such configuration is shown in FIGS. 4D, 4E, and 4F in which a knife edge tip 108a is shown. This type of tip 108a has a first end 168 with a rectangular cross-section 174 which is proximate to, and affixed to, the cantilevered end 114a of the cantilever 114. The rectangular cross-section 174 tapers down to a line, or knife edge 172 at a second end of the tip 108a. The knife edge 172 being proximate to the substrate surface 110.

Figure 1B:
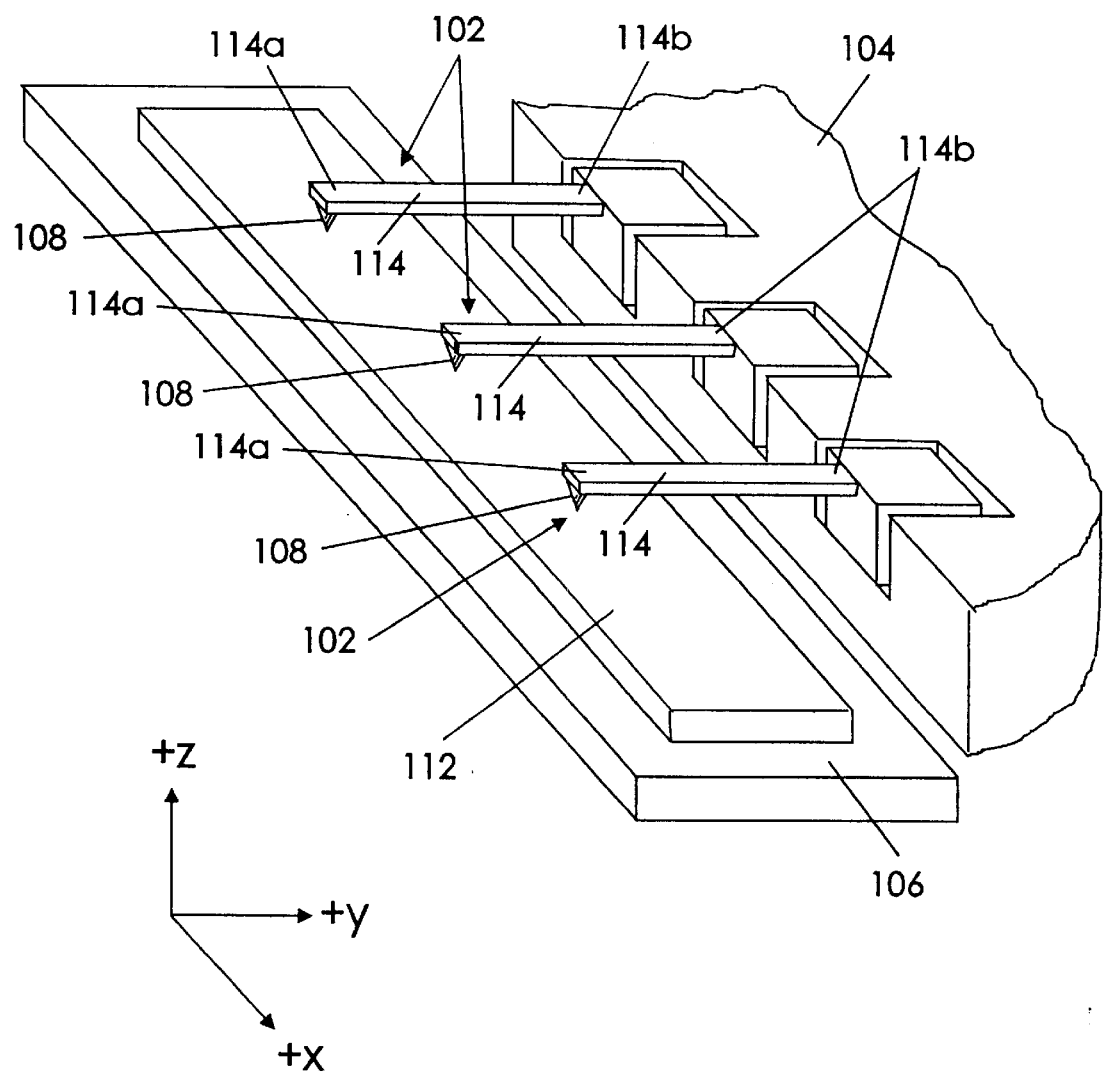
FIG. 1B illustrates a substrate plate having multiple goniometer tips.

FIG. 1B illustrates an array of goniometers 102 of the present invention. In certain applications it is preferred to employ such an array of goniometers 102 because the speed of the application increases with increasing number of goniometers 102. The tip 108 of the goniometer 102 discussed and illustrated in FIG. 1A is capable of tilting in four directions, namely, toward the positive x, negative x, positive y, and negative y directions. It is also capable of translating the tip 108 in the z-direction. However, it is understood to someone skilled in the art that a goniometer 102 providing tilt of the tip 108 in one or more directions is within the scope and spirit of the present invention, with the illustrated goniometer 102 merely being the preferred embodiment of the present invention.

Figure 6A:
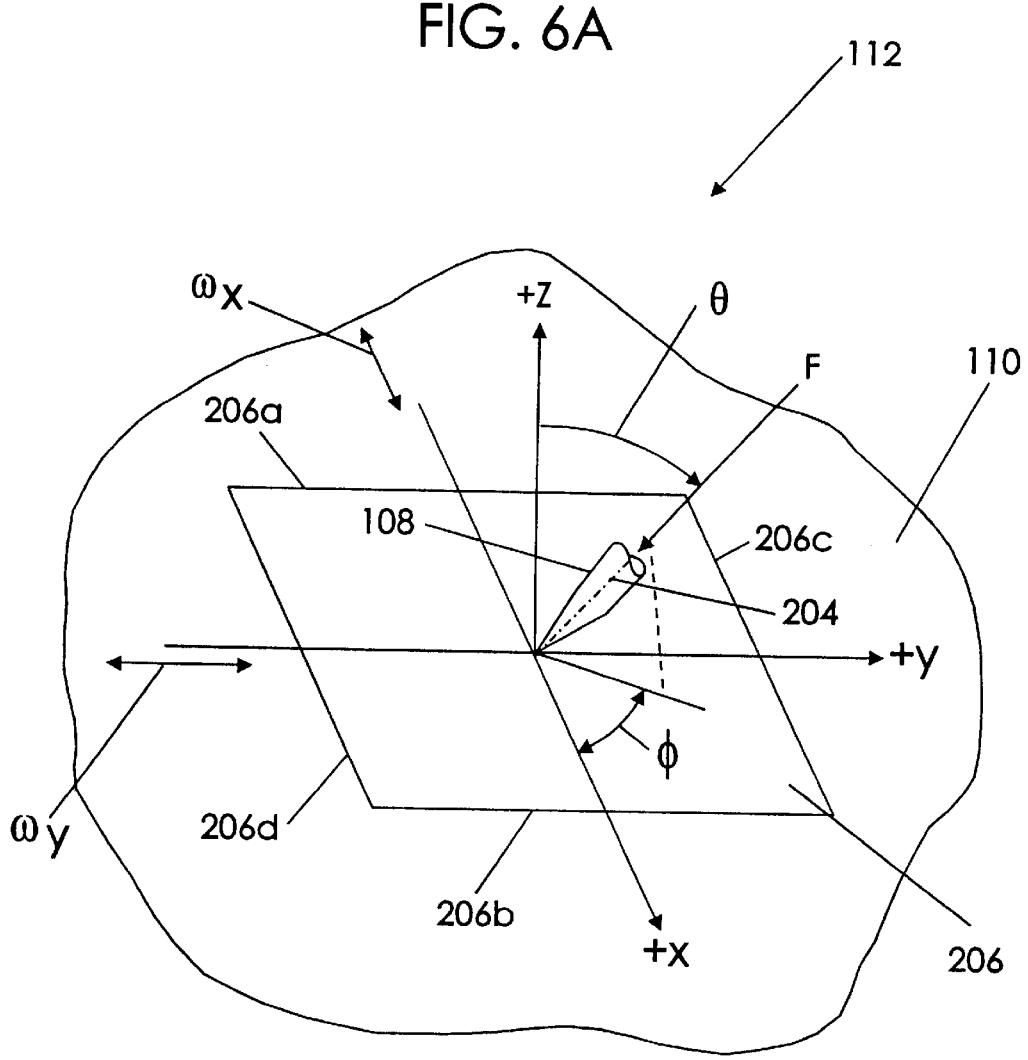
FIG. 6A illustrates an isometric view of a goniometer tip operating on a pixel of media surface.
Figure 6B:
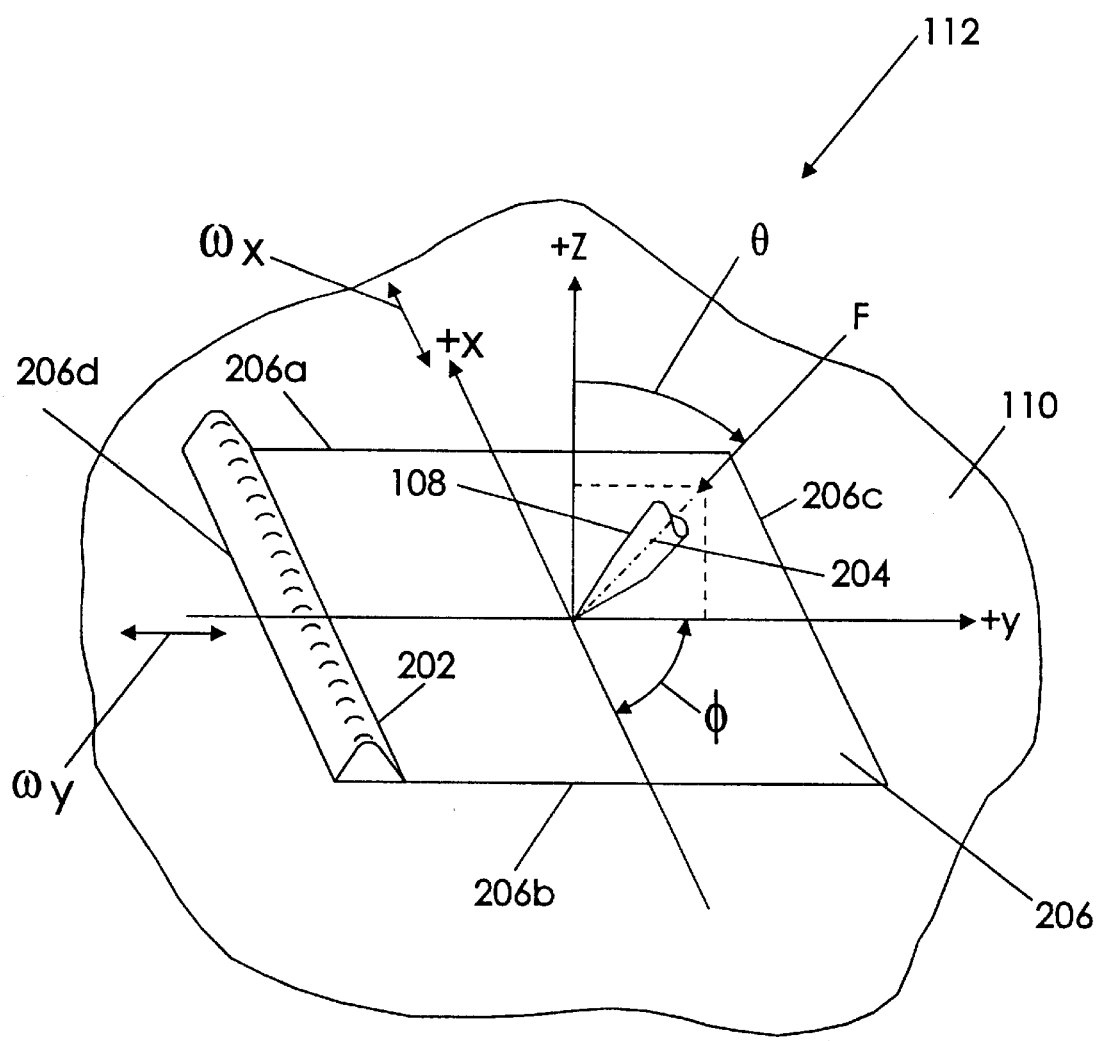
FIG. 6B illustrates the goniometer tip of FIG. 6A in which a molecular pile is formed on the negative y axis of the surface pixel.

Referring now to FIGS. 6A and 6B, an application for the goniometer 102 of the present invention is discussed in which the goniometer 102 is used with a scanning probe microscope, such as an AFM, to write data to the surface 110 of a substrate 112. Writing data to the surface 110 of a substrate 112 is discussed in detail in copending application Ser. No. 08/960,692 filed on Oct. 29, 1997, now U.S. Pat. No. 6,100,523, and incorporated herein by its reference. The basic method for writing involves pushing long chain molecules of a substrate material 112 with an AFM tip 108 and accumulating the long chain molecules to form one or more molecular piles 202. The height of the pile 202 depends upon the amount of material pushed and is related to the area swept by the tip 108, the dynamical properties of the long chain molecules, and the processing conditions (i.e., normal force of the tip, the tip angle, and the speed of sweeping). The tip 108 exerts a tip force, F, along the tip axis 204. Typically, the tip force F is in the range of 100 nN. The tip 108 is scanned inside a bit or pixel 206 occupying a portion of the substrate surface 110. The scanning takes place in the x-y plane at a corresponding frequency of $\omega_x$ and $\omega_y$ where $\omega_x$ is the scanning frequency parallel to the x-axis and $\omega_y$ is the scanning frequency parallel to the y-axis. The origin is defined as the location of the tip 108 before scanning commences. This is also the center of the pixel 206. The pixel 206 is centered about the x-y plane and has sides 206a, 206b, 206c, and 206d. Side 206a corresponds to the side to the pixel on the negative x axis, side 206b corresponds to the side on the x axis, side 206c corresponds to the side on the y axis, and side 206d corresponds to the side on the negative y axis.

If $\omega_x$ is greater than $\omega_y$, the long chain molecules will be swept in the x-direction to form a molecule pile 202 with its long axis parallel to the y-axis, that is, either toward side 206a or 206b. The inverse situation would occur if $\omega_y > \omega_x$.

Additionally, the angle θ the tip makes with the z-axis and the azimuthal angle φ, defined as the angle between the positive x-axis and the projection of the tip axis 204 on the x-y plane, determines the direction the molecules will be pushed toward. In FIG. 6A the tip 108 is oriented in an arbitrary direction with φ between 0° and 90° and θ between 0° and 90°. In order to create piles 202 parallel to the x- and/or y-axis θ is preferably always between 0° and 90°, and φ is preferably equal to 0°, 90°, 180° or 270°.

The tip 108 is tilted with the goniometer 102 of the present invention to achieve the varying angles of φ and θ necessary to push the piles 202 toward different sides of the pixel 206. Tilting the tip 108 toward the positive x-oxis corresponds to φ=0°, tilting the tip 108 toward the positive y-axis corresponds to φ=90°, tilting the tip 108 toward the negative x-axis corresponds to φ=180°, and tilting the tip 108 toward the negative y-axes corresponds to φ=270°. Angle θ corresponds to the degree at which the tip 108 is tilted toward the negative y-axis.

Movement of the tip 108 in the z-direction is also useful when writing with a scanning probe microscope where the tip 108 is controlled by the goniometer 102 of the present invention. After scanning in a direction within a pixel 206, the tip 108 is lifted with the fine z-axis movement provided by piezoelectric layer 118, moved back to a starting position, and lowered, again with the fine z-axis movement provided by piezoelectric layer 118, before beginning another scan. For example, referring to FIG. 6B, the tip starts at side 206c and is scanned toward the negative y-axis while it is in a lowered position corresponding to piezoelectric layer 118 being relaxed or contracted, which builds a pile 202 parallel to the x-axis on side 206d. After reaching side 206d, the tip 108 is lifted, i.e., piezoelectric layer 118 is expanded, and the tip 108 is returned to side 206c where it is again lowered and scanned toward side 206d. Concomitantly, while one tip 108 is writing, another tip 108 may be writing another pixel 206 with a different set of $\omega_y$, $\omega_x$, θ, and φ conditions. This process is repeated until a sufficiently sized pile 202 is created. The fine movement along the z-axis provided by the goniometer is especially important if an array of tips is used, as shover in FIG. 1B, to control the writing operation of one tip independent from the other tips in the array. If only a single tip is being utilized for writing, then the z-motion of the stage 106 will serve the same purpose. When moving the tip 108 from pixel 206 to pixel 206, the coarse z-axis movement provided by the stage 104 is utilized.

FIG. 6B illustrates the situation where φ is equal to 90° (i.e., toward the positive y-axis, as shown in FIG. 6B), the tilt angle θ≧5°, and $\omega_y > \omega_x$. In this situation the long chain molecules will then be pushed along the y-axis and the pile 202 will be formed parallel to the x-axis, and on the negative side of the y-axis, designated as side 206d. Under the condition where θ~0, the molecule pile 202 will form on both sides of the high frequency sweep direction.

Preferred substrate materials, substrate material characteristics and writing conditions which facilitate more efficient and faster writing are also discussed in copending application Ser. No. 08/960,692 filed on Oct. 29, 1997 and now U.S. Pat. No. 6,100,523 incorporated herein by its reference.

As discussed earlier and shown in FIGS. 6A and 6B, it can be seen that the bit occupies a pixel 206 of the surface area 110. The molecular piles 202 can be moved to locations around the periphery of the pixel 206 to form one of 16 bit configurations.

Referring to FIG. 7, there is illustrated the sixteen different bit configurations possible, referred to by reference numerals 1–16 respectively. The molecular piles 202 can be moved to achieve all of the possible configurations shown by varying the variables discussed previously, namely $\omega_y$, $\omega_x$, θ, and φ. The variables needed to achieve each of the sixteen bit configurations are listed in table 1.

TABLE 1

| Pile Configuration | $\omega_x$ | $\omega_y$ | φ | θ |
|---|---|---|---|---|
| 1 | — | — | — | — |
| 2 | low | high | 270° | ≧5° |
| 3 | low | high | 90° | ≧5° |
| 4 | low | high | — | 0° |
| 5 | high | low | 0° | ≧5° |
| 6 | high | low | 90° | ≧5° |
| 7 | high | low | — | 0° |
| 8 | successive combination of 2 and 5 | | | |
| 9 | successive combination of 2 and 6 | | | |
| 10 | successive combination of 2 and 7 | | | |
| 11 | successive combination of 3 and 5 | | | |
| 12 | successive combination of 3 and 6 | | | |
| 13 | successive combination of 3 and 7 | | | |
| 14 | successive combination of 4 and 5 | | | |
| 15 | successive combination of 4 and 6 | | | |
| 16 | successive combination of 4 and 7 | | | |

Fifteen of the configurations (reference numerals 2–16 in FIG. 7) are achieved by pushing the molecular piles 202 to different sides 206a, 206b, 206c, and 206d along the periphery of the surface pixel 206. The sixteenth bit (reference numeral 1 in FIG. 7) is a null pixel, having no molecular piles 202.

Additionally, configurations 2–7 are achieved in a single operation using the variables listed on table 1. Configurations 8–16 are achieved by successive operations used to achieve configurations 2–7. For example, configuration 8 is achieved by successively forming combinations 2 and 5 within the same pixel 206.

These molecular pile configurations allow a single bit to be written in sixteen different ways making the data naturally base sixteen, thereby improving the storage density by sixteen fold over binary data storage.

Another application for the goniometer of the present invention, as discussed in copending application Ser. No. 08/960,692 filed on Oct. 29, 1992 now U.S. Pat. No. 6,100,523, and incorporated herein by its reference, will now be discussed with reference to FIG. 8. FIG. 8 illustrates a molecular bar-code, referred to generally by reference numeral 300. The bar code 300 is formed on the surface 110 of a substrate 112 using the method of the present invention and the writing method previously discussed. Bar-codes of this type can be made very small, can be written by the method previously discussed, and read using conventional methods known in the art.

An application for the molecular bar-code 300 is illustrated in FIG. 8 in which the bar-code 300 is disposed on the surface 110 of a silicon wafer (substrate 112).

There are several steps (gates) which a silicon wafer goes through during its fabrication. Each step can be performed by different processing equipment to achieve the same end result. In a given fabrication line, each wafer, in principle, can undergo processing at different process conditions, for example, at different deposition temperatures. Therefore, silicon wafers from the same fabrication lines and processing equipment can undergo a combination of different processes used in their fabrication. The processes that each silicon wafer undergoes is typically recorded, in an extensive process known in the art as "bookkeeping." Bookkeeping is necessary when determining which processes make for a higher quality wafer. However, the bookkeeping process can be quite expensive.

The molecular bar-code illustrated in FIG. 8 can contain the bookkeeping information under which the silicon wafer was fabricated. It can be placed on the wafer in a compact form and since it is placed on the silicon wafer to which it refers, the need to cross-reference or match-up silicon wafers with respective bookkeeping records is eliminated. FIG. 8 shows a series of pixels 206 arranged side to side on the surface 110 of a silicon wafer 112. Molecular piles 202 are formed within the pixels 206 as described above to form a series of parallel lines, the lines being the piles 206 themselves. The bar-code 300 can contain a combination of thin lines 302 made up of a single pile 206, thick lines 304 made up of two piles 202 formed on facing sides of two adjacent pixels 206, and null pixels 306. Each combination of thin lines 302, thick lines 304, and null pixels 306 is used to contain the bookkeeping information used in the silicon wafers fabrication. Since the bar code 300 contains only parallel piles 202, the knife edge tip 108a of FIG.s 4C and 4D is particularly useful. Instead of being pointed, the knife edge tip 108a has a knife edge 174 which is only useful when scanning in one direction Scanning in one direction results in parallel piles 202 which is well suited to the molecular bar code application.

Yet another application of the goniometer of the present invention is for a method to test the interactive forces between two molecular structure with a scanning probe microscope, preferably a AFM, at differing degrees of tip interaction. The AFM is equipped with a goniometer of the present invention which provides tip deflection at least along the x and y axes, and preferably along the x, y, and z axes. Therefore the molecular interaction between the tip and substrate surface can be measured at various tip angles ($\theta$). Dynamic molecular interactions can also be measured while varying the tip angle ($\theta$) by simultaneously oscillating the tip about the z-axis.

The lowest interaction will be where the tip is vertical relative to the substrate surface ($\theta$ equals 0°) because the interacting area is the least. Since the tip geometry is well known, the analysis of the particular force versus.displacement curve where the tip is vertical will lead to quantitative information on molecular interaction between the tip and substrate molecules.

Figure 9:
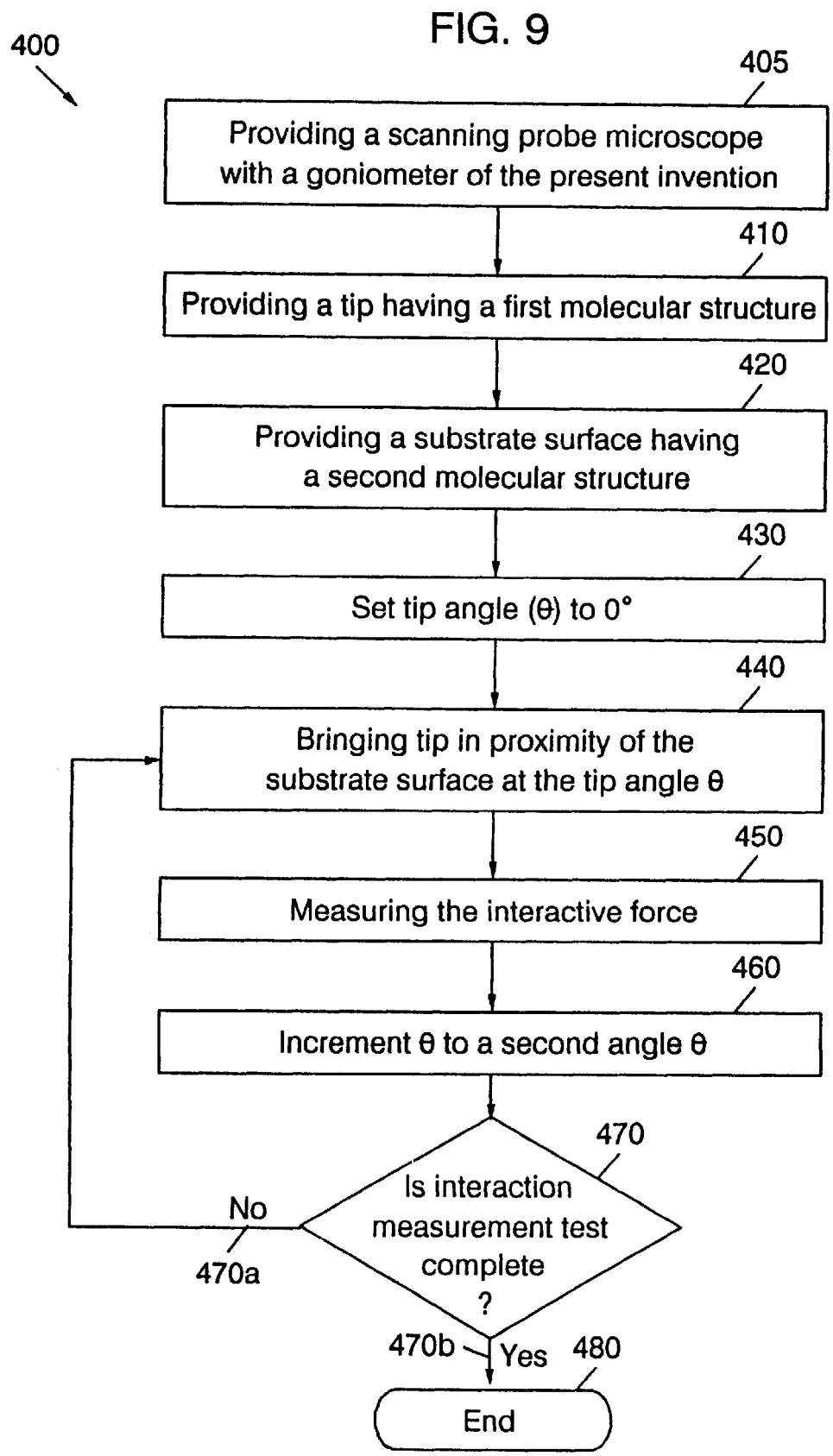
FIG. 9 illustrates a flow chart showing the steps of a method for measuring the interaction between two molecular structures using the goniometer of the present invention.

The preferred method for measuring the interactive forces between the tip and substrate molecules will now be described with reference to FIG. 9, in which the method is generally referred to by reference numeral 400. The method is initiated at step 405 by providing a scanning probe microscope with a goniometer of the present invention. At steps 410 and 420, respectively, a tip is provided having a first molecular structure and a substrate surface is provided having a second molecular structure. At step 430 the tip angle ($\theta$) is initiated at a first angle, preferably 0°. At step 440 the tip is brought in proximity to the substrate surface at the first angle relative to the substrate surface, such that a force of interaction exists between the tip and substrate material. The interactive force between the tip and the substrate material is then measured at step 450 for the first angle, using measuring methods known in the wait. The tip angle ($\theta$) is then incremented or varied at step 460 to a second angle using the goniometer of the present invention. Preferably, steps 440 and 450 are repeated for any number of tip angles ($\theta$) by undergoing a test at step 470. If the interaction measurement test has been completed, that is if all the required data has been gathered, the method proceeds along step 470b and terminates at step 480. However, should additional data need to be gathered at another tip angle ($\theta$), then the interaction measurements have not been completed and the method proceeds along step 470a, whereby steps 440 and 450 are repeated for the new angle. This loop (steps 440 through 470a) repeats until the interaction measurements between the first and second molecular structures are completed.

Figure 10:
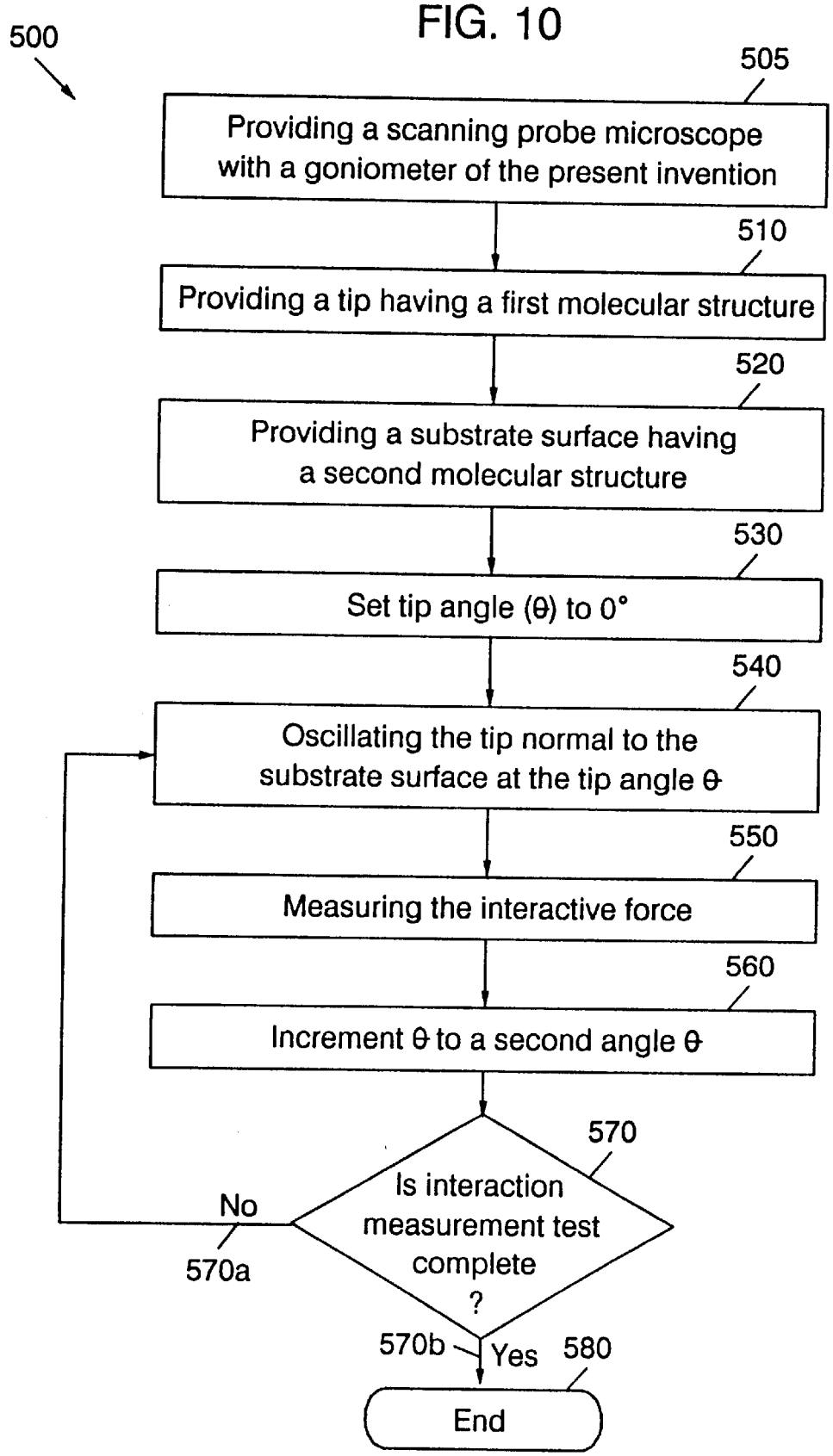
FIG. 10 illustrates a flow chart showing the steps of a method for measuring the dynamic interaction between two molecular structures using the goniometer of the present invention.

A variation of the preferred method for measuring the interactive forces between the tip and substrate molecules in which the tip oscillates in the z-direction, will now be described with reference to FIG. 10, in which the method is generally referred to by reference numeral 500. The method for measuring the dynamic interaction between two molecular structures is initiated at step 505 by providing a scanning probe microscope with a goniometer of the present invention, which is also capable of translation about the z-axis, preferably provided by a three axis stage (as discussed above). At steps 510 and 520, respectively, a tip is provided having a first molecular structure and a substrate surface is provided having a second molecular structure. At step 530 the tip angle ($\theta$) is initiated at a first angle, preferably 0°. At step 540 the tip is oscillated along a path normal to the substrate surface (along the z-axis) at the first angle, such that forces of interaction exists between the tip and substrate surface.

The interactive force between the tip and the substrate material is then measured at step 550 for the first angle at various positions along the normal path, using measuring methods known in the art. The tip angle ($\theta$) is then incremented or varied at step 560 to a second angle using the goniometer of the present invention. Preferably, steps 540 and 550 are repeated for any number of tip angles ($\theta$) by undergoing a test at step 570. If the interaction measurement test has been completed, that is, if all the required data has been gathered, the method proceeds along step 570b and terminates at step 580. However, should additional data need to be gathered at another tip angle ($\theta$), then the interaction measurements have not been completed and the method proceeds along step 570a, whereby steps 540 and 550 are repeated for the new angle. This loop (steps 540 through 570a) repeats until the interaction measurements between the first and second molecular structures are completed.

Yet another application for the goniometer of the present invention is to measure the dynamic interactive forces between tip and substrate materials while the tip swings in a pendular motion about either the y or x axes (perpendicular to the substrate surface). The interactive forces are then measured at various points about the tip's pendular motion. These measurements are useful for tribological studies where one is interested in understanding friction and wear between two materials at the molecular level. Two examples of such situations are, in magnetic storage where a read/write magnetic head grazes a magnetic media in very close proximity and at very high relative speed, and in developing methods to reduce friction between surfaces, such as in ball-bearings. A variation of the pendular motion analysis is where, in addition to the tip swinging about the x or y axis, the tip also oscillates about the z axis.

From the foregoing, it becomes readily apparent to one skilled in the art that the goniometer of the present invention offers increased versatility to scanning probe microscopes. Due to the inventive structure of the goniometer, the advantages offered by the tilting capability of the goniometer tip in at least one direction, and preferably in four directions, makes it particularly useful for pushing long chain molecules on a substrate surface and for measuring the interaction between the tip and substrate at varying tip angles which provides varying degrees of interaction.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A method for testing the interactive forces between two molecular structures with a scanning probe microscope at differing degrees of tip interaction, the scanning probe microscope having a goniometer including a cantilever having a cantilevered end and a supported end, a tip supported at the cantilevered end, and a block disposed at the supported end, said block having at least one pair of piezoelectric layers for controlling the tip about a substrate surface, the tip having a first molecular structure and the substrate surface having a second molecular structure, the method comprising the steps of:

bringing the tip in proximity to the substrate surface at a first angle relative to the substrate surface by controlling said at least one pair of piezoelectric layers, said piezoelectric layers being individually deformable at different rates resulting in deformation of said block and tilting of the cantilever and tip connected therewith, such that a force of interaction exists between the tip and substrate surface, measuring the interactive force between the tip and the substrate surface for the first angle, varying the tip angle to a second angle by controlling said at least one pair of piezoelectric layers, and measuring the interactive force at the second angle.

2. The method of claim 1, further comprising the step of repeating the varying and measuring steps for a plurality of tip angles.

3. A method for testing the dynamic interactive forces between two molecular structures with a scanning probe microscope at differing degrees of tip interaction, the scanning probe microscope having a goniometer including a cantilever having a cantilevered end and a supported end, a tip supported at the cantilevered end, and a block disposed at the supported end, said block having at least one pair of piezoelectric layers for controlling the tip about a substrate surface, the tip having a first molecular structure and the substrate surface having a second molecular structure, the method comprising the steps of:

oscillating the tip along a path normal to the substrate surface by controlling said at least one pair of piezoelectric layers and at a first angle relative to the substrate surface, said piezoelectric layers being individually deformable at different rates resulting in deformation of said block and tilting of the cantilever and tip connected therewith, such that forces of interaction exists between the tip and substrate material, measuring the interactive forces between the tip and the substrate surface for the first angle along the normal path, varying the tip angle to a second angle by controlling said at least one pair of piezoelectric layers, and measuring the interactive forces at the second angle along the normal path.

4. The method of claim 3, further comprising the step of repeating the varying and measuring steps for a plurality of tip angles.

5. A method for testing the dynamic interactive forces between two molecular structures with a scanning probe microscope at differing degrees of tip interaction, the scanning probe microscope having a goniometer including a cantilever having a cantilevered end and a supported end, a tip supported at the cantilevered end, and a block disposed at the supported end, said block having at least one pair of piezoelectric layers for controlling a tip about a substrate surface, the tip having a first molecular structure and the substrate surface having a second molecular structure, the method comprising the steps of:

swinging the tip in a pendular motion in a plane perpendicular to the substrate surface by controlling said at least one pair of piezoelectric layers, said piezoelectric layers being individually deformable at different rates resulting in deformation of said block and tilting of the cantilever and tip connected therewith, such that forces of interaction exists between the tip and substrate material, and measuring the interactive forces between the tip and the substrate surface for varying angles along the pendular path.

6. The method of claim 5, wherein the tip is also oscillated normal to the substrate surface.

* * * * *

UNITED STATES PATENT AND TRADEMARK OFFICE
CERTIFICATE OF CORRECTION

PATENT NO. : 6,552,339 B1 Page 1 of 1
DATED : April 22, 2003
INVENTOR(S) : Arunava Gupta et al.

It is certified that error appears in the above-identified patent and that said Letters Patent is hereby corrected as shown below:

Column 2,
Line 19, "It is yet..." should begin a new paragraph.

Column 3,
Line 10, "FIG. 2A" should read -- FIG. 1A --
Line 24, "toward.the" should read -- toward the --

Column 5,
Line 14, "20a" should read -- 120a --

Column 6,
Line 19, "However,..." should begin a new paragraph.
Line 19, "rips" should read -- tips --

Column 7,
Line 59, "0 $\geq$ 5" should read -- 0 $\gtrsim$ 5 --

Column 8,
Line 1, "08/960,692" should read -- 08/960,693 --

Column 9,
Line 38, "structure" should read -- structures --
Line 48, "The lowest..." should begin a new paragraph.

Signed and Sealed this

Twenty-eighth Day of October, 2003

JAMES E. ROGAN
*Director of the United States Patent and Trademark Office*